Patented Aug. 9, 1932

1,870,864

UNITED STATES PATENT OFFICE

WILLIAM BEACH PRATT, OF WELLESLEY, AND RALPH T. HALSTEAD, OF BOSTON, MASSACHUSETTS, ASSIGNORS TO DISPERSIONS PROCESS, INC., OF DOVER, DELAWARE, A CORPORATION OF DELAWARE

ART OF DISSOLVING AND DISPERSING NITROCELLULOSE

No Drawing.   Application filed February 26, 1929.   Serial No. 342,935.

This invention relates to the treatment of nitrocellulose, being more particularly concerned with its conversion into a solution of a type which may be used for various purposes in the arts, and which is dispersible in water. It further relates to the production of aqueous dispersions of nitrocellulose and their use in the arts.

We have discovered that nitrocellulose may be converted into a solution into which water may be incorporated without precipitating nitrocellulose and that when a hydrophilic colloid is incorporated into the solution and water gradually manipulated thereinto, a change of phase takes place and the nitrocellulose becomes dispersed in the acqueous medium. Various organic liquids may be employed to dissolve nitrocellulose, but we have found that there are certain water-insoluble organic solvents for nitrocellulose, such as wood creosote and hexahydrophenyl acetic acid (commercially known as hexalin acetate), which are particularly suitable, as they yield nitrocellulose solutions into which a comparatively large quantity of water may be incorporated, for instance an amount necessary to cause inversion to the water phase, without precipitating the nitrocellulose. On the other hand, some nitrocellulose solvents are unsuitable, as they yield solutions into which little, if any, water may be incorporated. When working with dilute nitrocellulose solutions of this latter type, it was found that with the addition of only a few drops of water, a pronounced precipitation of cellulose nitrate occurred where the water struck the solution. When working with more concentrated nitrocellulose solutions of this latter type, say of gel-like consistency, when water is added, there may not be the same readiness to precipitate nitrocellulose as in the case of dilute solutions, but the nitrocellulose gel apparently does not permit the incorporation of water, addition of the water into the gel and mixing merely resulting in a crumbling of the mass and the presence of water in free condition.

We have further found that wood creosote is particularly suitable for use in carrying out the process of the present invention, as it is not only capable of dissolving a comparatively large amount of nitrocellulose, but constitutes an excellent solvent for bodies such as camphor or cellulose acetate with which it may be desired to compound the nitrocellulose. The amount of wood creosote employed for this purpose may vary, depending upon the consistency of the solution desired. If a nitrocellulose solution or nitrocellulose compounding solution suitable for impregnating or coating purposes is desired, a comparatively large amount of wood creosote may be employed, but if the solution is to be subsequently dispersed in water, wood creosote may be used in amount only sufficient to dissolve the nitrocellulose or nitrocellulose compound and result in a solution of a gel-like consistency.

Various hydrophilic colloids may be used in effecting the dispersion of the dissolved nitrocellulose, such as the soluble caseinates, saponin, or the like, but when it is desired to produce dispersions suitable for the manufacture of transparent or translucent films, we prefer to use colloids such as gum tragacanth, gum acacia, and gelatine, since after the removal of water and solvent from the films, they are not opaque.

The process of the present invention may best be appreciated by citing certain examples of procedure such as the following. In all these examples, an excess of solvent was used in order to produce a liquid solution of nitrocellulose rather than one of gel-like consistency, as this permitted easy handling in the laboratory and the use of a portable electric mixer to effect an intimate admixture between the various materials.

Example 1

Ten parts by weight of nitrocellulose in the form of low viscosity nitrocotton was added with stirring to 50 parts of hexalin acetate, the mixture being heated to about 80° C. to facilitate conversion into a homogeneous liquid solution. To the solution was then added 10 parts of a 10% aqueous gum tragacanth solution which was prepared by soaking the hard, horn-like raw gum in water, for about twenty-four hours, and then heating to effect its solution. The 10% solution of gum tragacanth was a semi-solid paste and was readily disseminated throughout the cellulose nitrate solution to produce a homogeneous composition. Water was then gradually added and mixed into the solution, the solution taking up or absorbing the water substantially without precipitation of nitrocellulose until about 150 parts had been added, whereupon a change of phase occurred and the nitrocellulose solution became dispersed as fine, discrete particles in the aqueous medium. The dispersion was of a paste-like consistency, and when spread as a thin layer on glass and then dried, resulted in a continuous, translucent film.

*Example 2*

Ten parts by weight of nitrocellulose of the type used in the preceding example was added, with stirring, to 50 parts of wood creosote of the refined or water-white variety, the mixture being heated to facilitate the production of a homogeneous liquid solution. Ten parts of a 10% aqueous gum tragacanth solution was then stirred into the nitrocellulose solution and after a homogeneous composition was produced, water was added gradually at room temperature, with stirring, until a change of phase occurred and the nitrocellulose solution became dispersed as minute particles in the aqueous medium. The resulting dispersion had substantially the same characteristics as that of the preceding example.

*Example 3*

Five parts by weight of cellulose nitrate and 5 parts of cellulose acetate were added, with stirring, to 50 parts of wood creosote of refined or water-white variety, the mixture being heated to facilitate the production of a homogeneous solution. Ten parts of a 10% aqueous gum tragacanth solution was then stirred into the mixed cellulose acetate and cellulose nitrate solution until a homogeneous composition resulted, whereupon water was gradually added, with stirring, until a change of phase occurred and the mixed cellulose acetate and cellulose nitrate solution became dispersed as minute particles in the aqueous medium. The resulting dispersion possessed substantially the same characteristics as those resulting in the previous examples.

If desired, the nitrocellulose may be compounded with materials other than cellulose acetate, which are soluble in wood creosote, by dissolving the nitrocellulose along with such materials in the wood creosote. For instance, nitrocellulose, together with camphor, may be dissolved in wood creosote, and the solution used for various purposes in the arts, as for example in the impregnation of fibrous sheet material such as papers, felts, and fabrics, the impregnated product being used for such purposes as in the manufacture of shoe stiffeners, or, if desired, the wood creosote solution of nitrocellulose and camphor may be dispersed in water as described in the examples. The use of solvents such as hexalin acetate or wood creosote, together with colloids of the type of gum tragacanth, gum acacia, and gelatine, makes possible the production of transparent or translucent films. An aqueous dispersion of cellulose nitrate or cellulose nitrate compounded with cellulose acetate, camphor, pigments, fillers, and the like, may be used for various purposes in the arts. If desired, the dispersion may be mixed or compounded with pigments, fillers, water-soluble bodies such as dyes, or other materials, water-dispersed bodies such as latex, artificial dispersions of rubber, or dispersed asphalt. It may be incorporated into fibrous material such as cellulose and/or asbestos pulp in the beater engine, and the dispersed material coagulated on the fibers by the addition of a suitable electrolyte such as alum, before running off on a paper machine. It may be mixed with fibrous material such as cellulose and/or asbestos pulp, and rolled out into sheet material or moulded under heat and pressure, if desired, into articles, the cellulose nitrate or cellulose nitrate compound serving to bind the fibers together and to waterproof the product. Or it may be mixed with fillers such as wood flour or kieselguhr, to produce a plastic composition suitable for moulding.

One of the important advantages of the process hereinbefore described is that it is possible to produce aqueous dispersons of nitrocellulose or nitrocellulose compounds having a minimum water content, as the water necessary to effect dispersion may be regulated in amount so that little, if any, in excess of that necessary to constitute the nitrocellulose or nitrocellulose compound disperse phase of the composition may be present. Heretofore, in producing aqueous dispersions of nitrocellulose, it has been the practice to add the nitrocellulose solution with vigorous agitation to a comparatively large body of water containing a colloid, the water being present in large excess over that necessary to constitute it the continuous phase of the dispersion. Our process departs materially from such practice, as we incorporate the hydrophilic colloid into the nitrocellulose solution and then gradually work water into the solution containing the colloid until the water constitutes the continuous phase and the nitrocellulose solution the disperse phase, such procedure enabling us to control or regulate carefully the amount of water present in the finished dispersion, whereupon, if desired, the dispersion may be diluted to any desired consistency.

Having thus described the process of our invention, the compositions resulting therefrom, and various practical applications to which these may be put, it should be obvious to those skilled in the art that various changes and modifications might be resorted to without departing from the spirit or scope of invention as defined in the appended claims.

We claim:

1. A process which comprises dissolving nitrocellulose with a solvent capable of forming a solution into which water may be incorporated without precipitating nitrocellulose, incorporating a hydrophilic colloid into the solution, and gradually manipulating water thereinto until a change of phase takes place and the nitrocellulose solution disperses as minute particles in the aqueous medium.

2. A process which comprises dissolving nitrocellulose in wood creosote, incorporating a hydrophilic colloid into the solution, and gradually manipulating water thereinto until a change of phase takes place and the nitrocellulose solution disperses as minute particles in the aqueous medium.

3. A process of dispersing nitrocellulose in water, which comprises dissolving the nitrocellulose, incorporating a hydrophilic colloid into the solution, and gradually adding water to and mixing it with the solution until a change of phase takes place and the nitrocellulose disperses in the aqueous medium.

In testimony whereof we have affixed our signatures.

WILLIAM BEACH PRATT.
RALPH T. HALSTEAD.